United States Patent [19]

Unuma

[11] Patent Number: 4,773,579

[45] Date of Patent: Sep. 27, 1988

[54] WEB FEED TRACTOR

[75] Inventor: Sadao Unuma, Obu, Japan

[73] Assignee: Tokai Kogyo Kabushiki Kaisha, Aichi, Japan

[21] Appl. No.: 32,556

[22] Filed: Apr. 1, 1987

[30] Foreign Application Priority Data

Apr. 8, 1986 [JP] Japan .............................. 61-52333[U]

[51] Int. Cl.⁴ .............................................. G03B 1/22

[52] U.S. Cl. ............................................... 226/74

[58] Field of Search .............................. 226/74, 75; 400/616-616.3

[56] References Cited

U.S. PATENT DOCUMENTS 2,353,219 7/1944 Capstaff ............................ 226/74 X
2,961,137 11/1960 Menkel ............................ 226/74 X
3,289,904 12/1966 Foley .................................. 226/74
3,392,893 7/1968 Bennett et al. .
3,507,431 4/1970 Hepp et al. .
3,608,801 9/1971 Nystrand .............................. 226/74
3,688,959 9/1972 Staneck et al. .
3,825,162 7/1974 Hubbard .
3,938,721 2/1976 Staneck et al. .
4,129,239 12/1978 Hubbard .
4,130,230 12/1978 Seitz .
4,194,660 3/1980 Seitz ...................................... 226/74

FOREIGN PATENT DOCUMENTS 164744 5/1984 Japan .
858501 1/1961 United Kingdom ................. 226/74

*Primary Examiner*—Stuart S. Levy
*Assistant Examiner*—Lynn M. Sohacki
*Attorney, Agent, or Firm*—Dennison, Meserole, Pollack & Scheiner

[57] ABSTRACT

A web feed tractor having a pair of side frames, a driving pulley and at least one idler pulley rotatably supported between the side frames at spaced intervals, an endless feed belt trained around the driving and idler pulleys, at least one support roller rotatably disposed between the side frames and adapted to support the inner surface of the upper reach of the feed belt, and restraining means disposed between the driving and idler pulleys and the feed belt and adapted to restrain lateral meandering of the feed belt.

2 Claims, 3 Drawing Sheets

WEB FEED TRACTOR

BACKGROUND OF THE INVENTION

1. Field of the Invention

The present invention relates to tractors for feeding continuous webs as are generally used in printers and computers.

2. Description of the Prior Art

Such tractors may include a pair of side frames, a driving and an idler pulley rotatably supported between the side frames at spaced intervals, and an endless feed belt trained around the driving and idler pulleys, the feed belt having on the outer surface thereof a predetermined number of feed pins engageable with equispaced perforations formed in a continuous web. One of these tractors is disclosed, for example, in Japanese Laid-Open Utility Model Publication No. 59-164744.

On such web feed tractors, it is common to provide certain mechanisms which serve to prevent disengagement of the feed pins from the perforations in the feed belt. Thus, in some designs, the opposite edges of the feed belt may be abutted against the inner walls of the side frames so as to restrain lateral meandering of the feed belt; and a belt drive support element is provided on the inner wall of one of the side frames so as to support the inner surface of the upper reach of the feed belt and thereby prevent deflection of the feed belt.

In such a conventional web feed tractor, however, during driving of the feed belt, sliding friction is produced between the inner walls of the side frames and the opposite edges of the feed belt and between the linear surface of the belt drive support element of the side frame and the inner surface of the feed belt. Then, it has been necessary to employ a driving unit for the driving pulley which has a larger output by the amount equivalent to the sliding frictional force, and such a larger output of the driving unit disadvantageously causes so much increase of equipment and operation costs.

SUMMARY OF THE INVENTION

It is, accordingly, an object of the present invention to provide an improved web feed tractor which eliminates the aforenoted disadvantages.

It is another object of the present invention to provide an improved web feed tractor having a positive means for preventing disengagement of the feed pins of the feed belt from the associated perfortions in a continuous web.

According to the present invention, a web feed tractor includes a pair of side frames, a driving pulley and at least one idler pulley rotatably supported between the side frames at spaced intervals, and an endless feed belt trained around the driving and idler pulleys, the feed belt having on the outer surface thereof a predetermined number of feed pins engageable with the associated perforations formed in a continuous web. The web feed tractor of the invention is characterized by comprising at least one support roller rotatably disposed between the side frames and adapted to support the inner surface of the upper reach of the feed belt, and restraining means disposed between the driving and idler pulleys and the feed belt and adapted to restrain lateral meandering of the feed belt.

Thus, in the web feed tractor of the present invention, disengagement of the feed pins of the feed belt from the associated perforations in the continuous web can be prevented by preventing deflection and lateral meandering of the feed belt. Specifically, deflection of the feed belt is prevented by the rotatable support roller which supports the inner surface of the upper reach of the feed belt. Also, lateral meandering of the feed belt is restrained by the restraining means disposed between the feed belt and the driving and idler pulleys.

Furthermore, the friction produced between the feed belt and the support roller and between the feed belt and the restraining means is rolling friction and hence, the frictional force can be minimized as compared with the conventional sliding frictional force.

The present invention will become more fully apparent from the claims and description as it proceeds in connection with the drawings.

DETAILED DESCRIPTION OF THE PREFERRED EMBODIMENT

Figure 1:
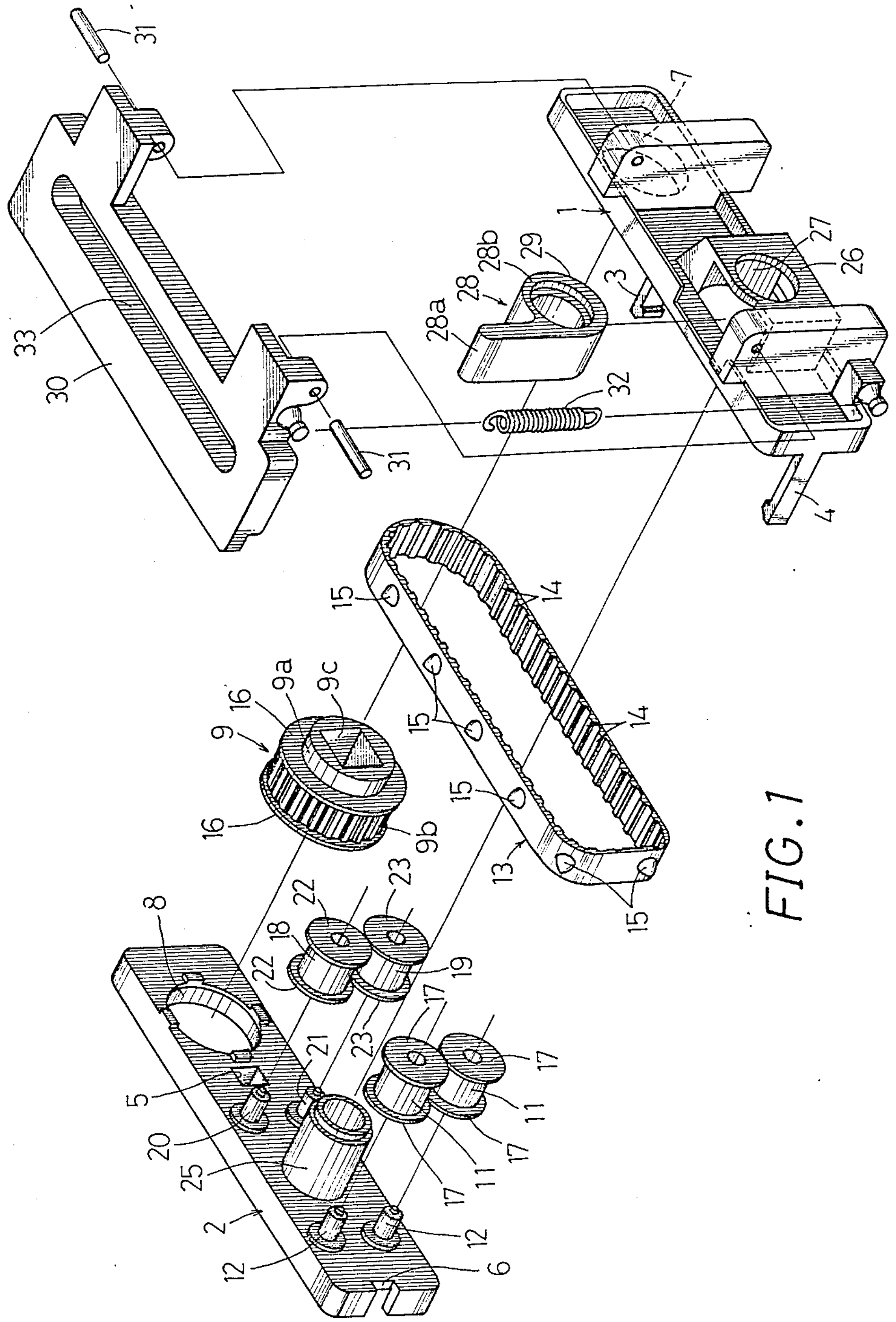
FIG. 1 is an exploded perspective view of a web feed tractor according to a preferred embodiment of the present invention.
Figure 2:
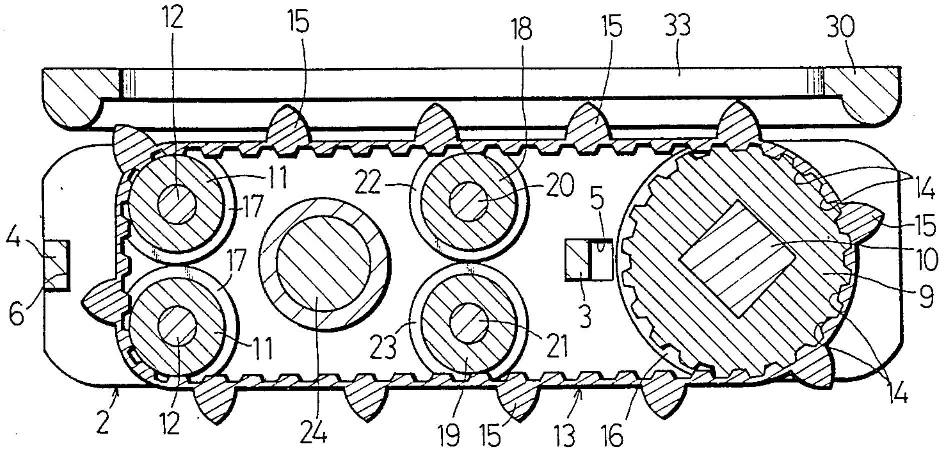
FIG. 2 is a sectional side view of the web feed tractor of FIG. 1.
Figure 3:
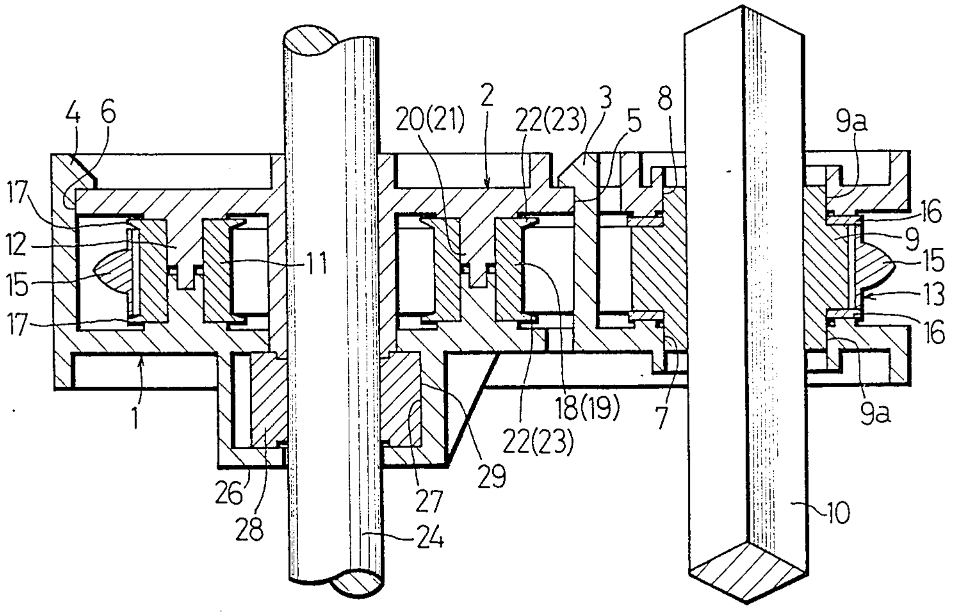
FIG. 3 is a sectional plan view of the web feed tractor of FIG. 1.

Referring now to FIGS. 1, 2 and 3, shown therein is a web feed tractor constructed in accordance with the present invention. As shown therein, the web feed tractor has a pair of side frames 1 and 2 disposed in parallel, spaced relation. The side frame 1 is formed with a pair of connecting arms 3 and 4 projecting laterally from the inner wall surface thereof. The other side frame 2 has a square locking hole 5 and a notch or locking groove 6 with which the respective connecting arms 3 and 4 are detachably engageable. Thus, the side frames 1 and 2 are connected as an assembly by engagement of these connecting arms 3 and 4 with the locking hole 5 and the locking groove 6.

The side frame 1 has a through hole 7 formed adjacent one end thereof, and the side frame 2 has a concentric through hole 8 formed adjacent one end thereof. The holes 7 and 8 are adapted to receive rotatably therein outer surfaces of opposite bosses 9*a* of a driving pulley 9 now to be described. This driving pulley 9 has at the center of the boss 9*a* a square through hole 9*c* through which a square driving shaft 10 extends to transmit torque to the driving pulley 9, the latter being axially movable on the driving shaft 10. The driving pulley 9 also has between the outer surfaces of the bosses 9*a* a larger diameter pulley portion 9*b* having feed teeth circumferentially arranged at predetermined pitches.

A pair of small diameter idler pulleys 11 are rotatably supported by a pair of pins 12, respectively, between the inner side surfaces of the side frames 1 and 2 adjacent the respective other ends thereof. An endless feed belt 13 is trained around the driving pulley 9 and the pair of vertically disposed idler pulleys 11.

The inner periphery of the feed belt 13 has a plurality of belt teeth 14 adapted to mesh with the feed teeth of the driving pulley 9, so that the feed belt 13 can be driven by rotation of the driving pulley 9. The feed belt 13 also has a predetermined number of feed pins 15 projecting from the outer surface thereof, the feed pins 15 being engageable with equispaced perforations formed in a continuous web along its marginal edges. The center-to-center distance between the driving pulley 9 and the idler pulleys 11 are set so that at least three feed pins 15 may be located on the upper reach of the feed belt 13.

The driving pulley 9 is provided adjacent the opposite sides of the pulley portion 9*b* a pair of restraining flanges 16 adapted to engage and support the opposite side edges of the feed belt 13. In this embodiment, the restraining flanges 16 are formed separate from the driving pulley 9, and each restraining flange 16 is fitted through the end of the boss 9*a* of the driving pulley 9 to a position where it abuts against the respective side of the pulley portion 9*b*. It is to be noted that the restraining flanges 16 may be formed integrally with the driving pulley 9.

The idler pulleys 11 are provided with each one pair of restraining flanges 17 which cooperate with the restraining flanges 16 of the driving pulley 9 to prevent any lateral meandering of the feed belt 13. In this embodiment, each pair of restraining flanges 17 are formed intergrally with the idler pulley 11 at the opposite sides thereof.

A belt drive support roller 18 and a belt return guide roller 19 are provided substantially centrally between the driving pulley 9 and the idler pulleys 11 and are rotatably carried by pins 20 and 21, respectively. The support roller 18 serves to support the inner surface of the upper reach of the feed belt 13; and the guide roller 19 serves to engage the inner surface of the lower reach of the feed belt 13. The rollers 18 and 19 employed in this embodiment are of the same configuration and construction as those of the idler rollers 11, and are also formed at the opposite sides with restraining flanges 22 and 23, respectively, for guiding the edges of the feed belt 13.

The side frame 2 is provided with a cylindrical boss 25 which is axially movably fitted onto a support shaft 24 which will be explained later.

Figure 4:
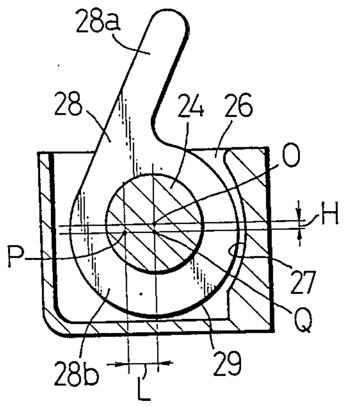
FIG. 4 is a sectional view showing the cam surface of the locking lever and the engaging surface of the retaining compartment in disengaged position.

The other side frame 1 is provided with a retaining compartment 26 having an open top and adapted to accommodate therein a locking lever 28 for releasably locking the assembly of the side frames 1 and 2 on the support shaft 24 at a desired position. As shown in FIG. 4, the retaining compartment 26 is formed at an inner side wall surface thereof with an engaging surface 27 which is arcuate around a point P which is deviated from the center O of the support shaft 24 by the distance H in the downward direction and the distance L to the left, as viewed in the drawing.

Figure 5:
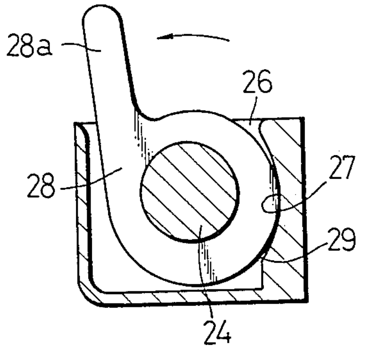
FIG. 5 is a sectional view showing the cam surface and the engaging surface in locked condition.

The locking lever 28 has a handle portion 28*a* and a boss portion 28*b* which is inserted through the top opening of the retaining compartment 26, with the handle portion 28*a* projecting outwardly through the opening of the retaining compartment 26 for manual actuation. The boss portion 28*b* of the locking lever 28 has at the center thereof a central bore (unnumbered) through which the support shaft 24 is movably inserted. The boss portion 28*b* also has on the outer periphery a substantially circular cam surface 29 whose center is a point Q deviated from the center O of the support shaft 24 by the distance H in the downward direction, as viewed in FIG. 4. The cam surface 29 is adapted to be brought in and out of engagement with the engaging surface 27 of the retaining compartment 26. As shown in FIG. 5, when the locking lever 28 is pivoted around the support shaft 24 in a direction in which the cam surface 29 of the locking lever 28 is brought into engagement with the engaging surface 27 of the retaining compartment 26, the assembly of the side frames 1 and 2 is locked at a desired position on the support shaft 24 so as to conform to various width webs.

The web feed tractor further comprises a holder plate 30 disposed atop the side frame 1 and adapted to be pivoted between an open position and a closed position around a pair of longitudinally spaced apart hinge pins 31. The holder plate 30 is normally held in the closed position in which it overlies the top surfaces of both side frames 1 and 2 under the action of a spring 32 so as to prevent upward movement of a continuous web. The holder plate 30 has a longitudinally extending slot 33 in which the feed pins 15 of the feed belt 13 can travel.

The side frames 1 and 2, driving pulley 9, idler pulleys 11, feed belt 13, locking lever 28 and other component parts may be made of synthetic resin material.

As is known, the driving shaft 10 and the support shaft 24 are disposed between frames of a printer or a computer, and the driving shaft 10 is rotated through a suitable driving unit from a power source, such as an electric motor.

In the embodiment thus constructed, a first assembly of side frames 1 and 2 is locked at a desired position on the support shaft 24 by the locking lever 28. The first assembly is used in conjunction with a second complementary assembly of side frames 1 and 2 that is the mirror image of the one shown in FIG. 1. The second assembly is positionally adjusted in correspondence to the width of the continuous web and locked at the adjusted position on the support shaft 24 by the locking lever 28. Then, the feed pins 15 on the respective feed belts 13 of the first and second assemblies of side frames 1 and 2 are engaged with the associated perforations on the opposite sides of the continuous web. The holder plates 31 are closed to complete setting of the continuous web.

With this condition existing, the driving pulleys 9 are rotated in a predetermined direction by the driving shaft 10 to drive the feed belts 13, causing the continuous web to be fed in the predetermined direction.

While the feed belt 13 is being driven, the opposite edges of the feed belt 13 are supported in abutment against the pair of restraining flanges 16 of the driving pulley 9 and the respective pairs of restraining flanges 17 of the idler pulleys 11, so that lateral meandering of the feed belt 13 can be restrained.

Furthermore, the inner surface of the upper reach of the feed belt 13 is supported by the support roller 18 and the inner surface of the lower reach of the feed belt 13 is supported by the guide roller 19, so that deflection of the upper and lower reaches can be prevented.

The friction produced between the respective restraining flanges 16 and 17 of the driving pulley 9 and the idler pulleys 11 and the opposite edges of the feed belt 13 and between the inner surface of the feed belt 13 and the respective outer surfaces of the rollers 18 and 19 is rolling friction, so that such a frictional force can be minimized as compared with sliding frictional force and consequently a motor having a relatively small capacity can be employed in the driving unit for the driving shaft 10.

Figure 6:
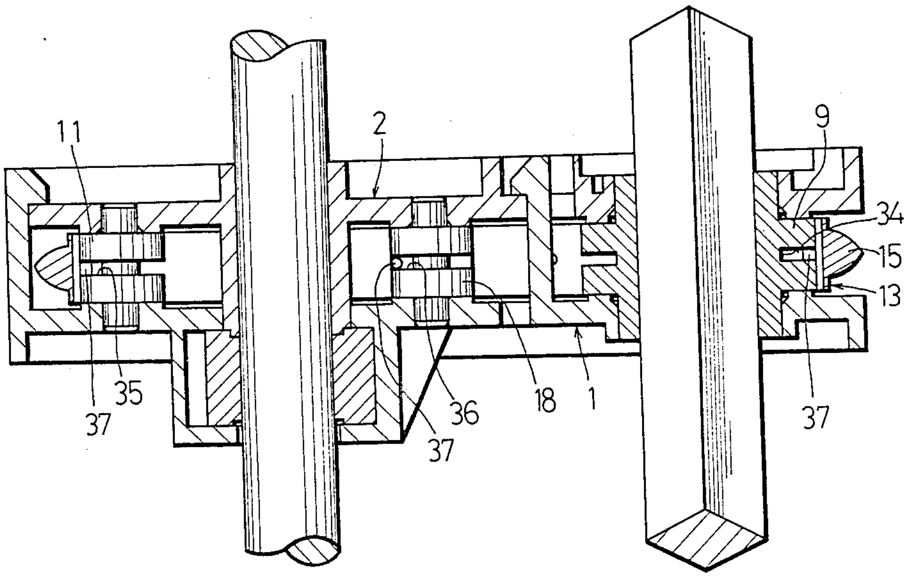
FIG. 6 is a sectional plan view showing a modified mechanism for restraining lateral meandering of the feed belt.

In the foregoing embodiment, the restraining means for restraining lateral meandering of the feed belt 13 is composed of the restraining flanges 16 and 17 disposed respectively on the opposite sides of the driving pulley 9 and the idler pulleys 11, but it is not limited to such a construction. For example, as shown in FIG. 6, it may be composed of annular restraining grooves 34, 35 and 36 formed in the respective outer surfaces of the driving pulley 9, idler pulleys 11 and support roller 18 and a predetermined number of projections 37 formed at predetermined intervals on the inner surface of the feed belt 13 and adapted to be fitted in the restraining grooves 34, 35 and 36.

A pair of vertically disposed, small diameter idler pulleys 11 may be replaced by a single idler pulley 11 having substantially the same diameter as that of the driving pulley 9 and rotatably disposed between a pair of side frames 1 and 2, the feed belt 13 being trained about the driving pulley 9 and the idler pulley 11.

As described above, according to the present invention, the inner surface of the upper reach of the feed belt is supported by the support roller to prevent deflection of the feed belt, and furthermore, the restraining means disposed between the driving and idler pulleys and the feed belt serves to restrain lateral meandering of the feed belt to prevent disengagement of the feed pins of the feed belt from the perforations in the continous web.

The friction produced between the feed belt and the support roller and between the feed belt and the restraining means is rolling friction and hence, the frictional force may be minimized as compared with the conventional sliding frictional force. As the result, abrasion of the feed belt can be reduced for improved belt durability, and at the same time, the driving unit for the driving shaft can be the one having a relatively small capacity, thereby reducing the equipment and operation costs.

While the invention has been described with reference to a preferred embodiment thereof, it is to be understood that modifications or variations may be easily made without departing from the spirit of this invention which is defined by the appended claims.

What is claimed is:

1. A web feed tractor comprising:

a pair of juxtaposed side frames;

a driving pulley rotatably supported between one end of said side frames;

a pair of small diameter idler pulleys rotatably supported between the other ends of said side frames, the outside diameter of each of said idler pulleys being substantially one-half of the outside diameter of said driving pulley;

an endless feed belt trained around said driving pulley and said pair of idler pulleys, the portion of said endless feed belt between the driving pulley and one of said idler pulleys defining an upper reach portion, the portion of said endless feed belt between said driving pulley and the other of said pair of idler pulleys defining a lower reach portion, said feed belt having on an outer surface thereof a predetermined number of feed pins engageable with equi-spaced perforations formed in a continuous web;

the center-to-center distance between said driving pulley and said pair of idler pulleys being such that the number of said feed pins is plural at all times on the outer surface of the upper reach web contacting portion of said feed belt; and a pair of small diameter rollers rotatably supported between said side frames intermediate said driving pulley and said pair of idler pulleys, one of said pair of rollers guidingly engaging the inner surface of the upper reach of said feed belt and the other engaging an inner surface of the lower reach of said feed belt;

said driving pulley, said pair of idler pulleys and said pair of rollers each having a pair of restraining flanges formed peripherally about the opposite sides thereof for guidingly engaging the opposite edges of said feed belt between said flanges so as to restrain lateral meandering of said feed belt.

2. A web feed tractor comprising:

a pair of juxtaposed side frames;

a driving pulley rotatably supported between one end of said side frames;

a pair of small diameter idler pulleys rotatably supported between the other ends of said side frames, the outside diameter of each of said idler pulleys being substantially one-half of the outside diameter of said driving pulley;

an endless feed belt trained around said driving pulley and said pair of idler pulleys, the portion of said endless feed belt between the driving pulley and one of said idler pulleys defining an upper reach portion, the portion of said endless feed belt between said driving pulley and the other of said pair of idler pulleys defining a lower reach portion, said feed belt having on the outer surface thereof a predetermined number of feed pins engageable with equi-spaced perforations formed in a continuous web and having a predetermined number of spaced-apart projections formed on an inner surface thereof along the longitudinal central line thereof;

the center-to-center distance between said driving pulley and said pair of idler pulleys being such that the number of said feed pins is plural at all times on a lower surface of the upper reach of said feed belt; and a pair of small diameter rollers rotatably supported between said side frames intermediate said driving pulley and said pair of idler pulleys, one of said pair of rollers guidingly engaging the inner surface of the upper reach of said feed belt and the other engaging the inner surface of the lower reach of said feed belt;

said driving pulley, said pair of idler pulleys and said pair of rollers each having an annular restraining groove formed axially centrally in the outer surface thereof for releasably engaging said feed belt therein so as to restrain lateral meandering of said feed belt.

* * * * *